US011822666B2

(12) United States Patent
Seth

(10) Patent No.: US 11,822,666 B2
(45) Date of Patent: Nov. 21, 2023

(54) MALWARE DETECTION

(71) Applicant: Varun Seth, New Delhi (IN)

(72) Inventor: Varun Seth, New Delhi (IN)

( * ) Notice: Subject to any disclaimer, the term of this patent is extended or adjusted under 35 U.S.C. 154(b) by 214 days.

(21) Appl. No.: 17/298,108

(22) PCT Filed: Dec. 20, 2019

(86) PCT No.: PCT/IN2019/050938
§ 371 (c)(1),
(2) Date: May 28, 2021

(87) PCT Pub. No.: WO2020/136673
PCT Pub. Date: Jul. 2, 2020

(65) Prior Publication Data
US 2022/0027475 A1 Jan. 27, 2022

(30) Foreign Application Priority Data
Dec. 28, 2018 (IN) ............................ 201811049737

(51) Int. Cl.
*G06F 21/57* (2013.01)
*G06F 21/55* (2013.01)
*G06F 21/56* (2013.01)

(52) U.S. Cl.
CPC .......... *G06F 21/575* (2013.01); *G06F 21/552* (2013.01); *G06F 21/566* (2013.01); *G06F 21/568* (2013.01)

(58) Field of Classification Search
CPC .... G06F 21/575; G06F 21/552; G06F 21/566; G06F 21/568; G06F 21/53; G06F 21/56
See application file for complete search history.

(56) References Cited

U.S. PATENT DOCUMENTS

| | | | | |
|---|---|---|---|---|
| 8,091,127 | B2 | 1/2012 | Bradicich et al. | |
| 9,690,938 | B1 | 6/2017 | Saxe et al. | |
| 10,122,752 | B1 * | 11/2018 | Soman | H04L 63/0227 |
| 2011/0271343 | A1 * | 11/2011 | Kim | G06F 21/566 726/23 |
| 2014/0137255 | A1 * | 5/2014 | Wang | G06F 21/566 726/24 |
| 2018/0189484 | A1 * | 7/2018 | Danahy | G06N 20/00 |
| 2019/0005234 | A1 * | 1/2019 | Klonowski | G06F 21/566 |

OTHER PUBLICATIONS

International Patent Application No. PCT/IN2019/050938; Int'l Written Opinion and Search Report; dated Jun. 12, 2020; 9 pages.

* cited by examiner

*Primary Examiner* — Linglan Edwards
*Assistant Examiner* — Suman Debnath
(74) *Attorney, Agent, or Firm* — BakerHostetler

(57) ABSTRACT

Approaches for detecting and rectifying the malware in the computing systems are described. In an example, a request by a process or is intercepted by the malware detection module. Relevant information and characteristics pertaining to the request are extracted and on the based on the extraction, operational attributes are generated. These extracted operational attributes are analyzed and compared with the baseline attributes and if there are any anomalies present, the susceptible code or process originating from the intercepted request is ascertained as malicious.

17 Claims, 9 Drawing Sheets

MALWARE DETECTION

CROSS REFERENCE TO RELATED APPLICATIONS

This application is the National Stage of International Application No. PCT/IN2019/050938, filed Dec. 20, 2019, which claims the benefit of Indian Patent Application No. 201811049737, filed Dec. 28, 2018, the entireties of which are incorporated herein for any and all purposes.

FIELD OF INVENTION

The present subject matter relates, in general, to computer security, and, particularly, but not exclusively to, malware detection and rectification in computing systems.

BACKGROUND

To ensure computer security, antivirus scan engines are usually employed in computing systems. The antivirus scan engines may be on-access or on-demand. An on-access type of scan engine automatically scans every file that is accessed/opened by the user. If the file is found to be malicious, it is blocked by the scan engine. On the other hand, an on-demand scan engine scans a file/folder only when the user initiates a scan. When initiated, the on-demand scan engine opens each file in the selected folder and checks it against a malware signature database. These scan engines use several methods to identify malware. Examples of the methods include, but are not limited to, a signature-based detection method, a heuristic-based detection method, a behaviour-based detection method, and sandbox detection.

BRIEF DESCRIPTION OF DRAWINGS

The detailed description is described with reference to the accompanying figures. It should be noted that the description and figures are merely examples of the present subject matter and are not meant to represent the subject matter itself.

Figure 1:
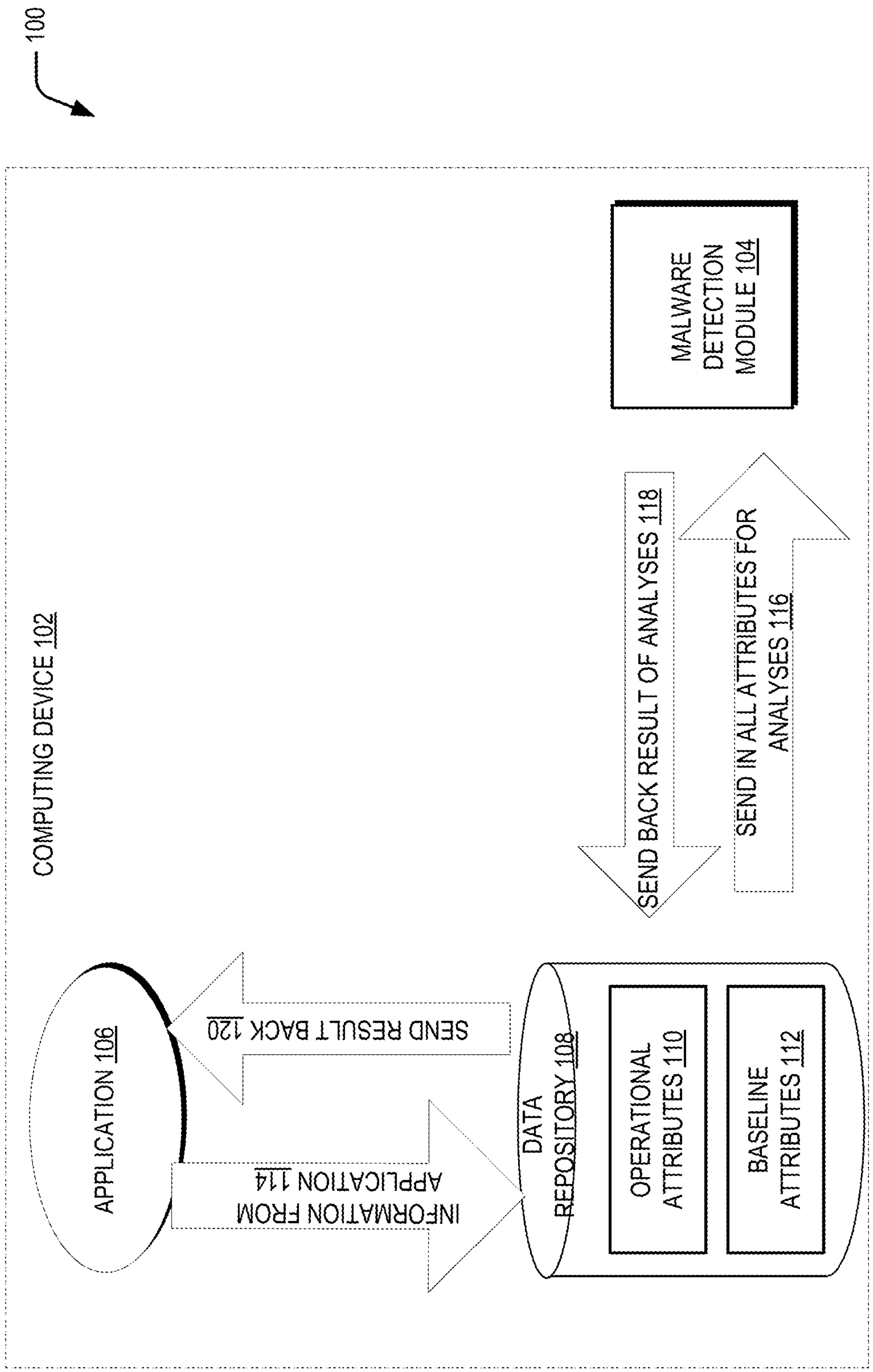
FIG. 1 is a diagram of a computing device to detect malware, as per an example of the present subject matter.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Existing antivirus programs use signature detection in combination with some heuristic analyses. The combination of these technologies is not sufficient to protect a computer from the growing number of malwares. As signature based anti-malware techniques are inherently reactive, a signature must be identified before the malware can be removed. However, a time lapse between release of the signature of the malware may range from hours to years depending upon how long after the spread of the malware was the malware detected and how complex the malware is for the malware researchers to decode.

Moreover, malwares are increasing at a high rate, making detection and rectification of all malwares difficult. To process such huge number of malwares consumes lot of computing resources and as a result slows down the computing systems. In addition, existing antivirus scan engines may provide false positives. The present subject matter discloses a malware detection and rectification system (hereinafter referred to as a system). In one implementation of this system automatically starts at boot time and may monitor all processes in real time, therefore, a user does not have to initiate any manual scans. In response to identifying the occurrence of a scanning event, data that is characteristic of malware may be searched. If data characteristic of malware is identified, a functionality is implemented to prevent the malware from executing on the system and undoing any changes brought about by it. In another implementation of the present subject matter, a manual scan may be initiated by the user or the operating system to identify malware present on the system using a subset of the same approach.

In the first implementation, a request for performing an operation, such as a read operation, a write operation, a rename operation, and the like is received by the system. Upon interception, the system extracts relevant information from the request and stores the relevant information. The relevant information may be extracted by monitoring the universe of functions that a malware might use and therefore aid in prediction of the malware. It may be noted that the term 'universe of functions' refer to a plurality of computer implemented functions that a susceptible code is likely to implement. It may be noted that such a susceptible code may implement any one or more functions individually or may implement such functions in combination with other one or more functions. The present subject matter employs various approaches to monitor interested process activities in the computing system. These approaches keep collecting detailed information about interested process activities and feed it to the malware detection module in real time. The various techniques include disassembler, virtual machine, heuristic scanning and matching, keyword analyses, behavioural scan, data mining and so on. On combining all of these approaches, the anti-malware detection analyzes process activities like what and how the process is behaving. In an example, the plurality of functions further comprises creating, reading, writing one of data and entries stored on the computing system, and modifications affected onto system configuration entries.

In the manual scanning approach, the present subject matter scans critical configuration entries and/or any configuration entries linked to such an entry within the operating system which may be used by malware & then employs the same approach to analyse these entries. Example of system configurations to scan are configuration entries that help run the malware on system startup or at a specified time, entries which help in injecting the malware code in other processes and such.

By combining various techniques to collect detailed information the system leverages the benefits of each individual approach and overcomes the weaknesses of each when taken individually. Based on this input, the system may generate operational attributes for the process that is presently executing. Thereafter, these operational attributes are analyzed and compared with baseline attributes. It is to be noted that for certain operations, such as certain open operations, comparison of the attributes may not be performed.

If the malware is detected, the system halts the process and informs the user about the malware and performs an action (either user defined or pre-defined) on the operation. If the malware is not detected, the request is forwarded to the appropriate system. In an implementation, the system may also perform a recovery operation wherein the system analyzes what parts of the operating system have been affected by the malware and undoes all the changes made by the malware.

The instant detection of malware assures that the system is perpetually monitored for malware and enjoys highest level of protection. Further, the system invokes selective techniques based on the analysis required, thus minimizing resource consumption. As the present subject matter does not use traditional signature analyses, therefore there may be no need to update any database regularly. As a result, internet usage is reduced, and bandwidth is saved. In addition, the system of the present subject matter becomes cost efficient.

As various techniques are employed to monitor interested process activities in the computing system, the present subject matter facilitates in catching any new and old malware. The present subject matter relies on characteristics of malware. As a result, regular updates may need not be performed in the present subject matter to catch malware.

The present subject matter does not provide or minimally provides false alarms of legitimate files. The present subject matter analyses characteristics which are deep rooted into a malware and collects more data via techniques like virtual machine, heuristic analyses, behaviour analyses, data mining, disassembler, and pattern recognition. All this data is analyzed as a combined set of homogeneous data. This homogeneous analysis of data as a combined set minimizes false-positives. Further, the detection of malware as per the present subject matter is extremely fast and does not slow down the computer.

The present subject matter can also recognize which files are infected by malware and thereby, quarantine and recover them. One implementation of the present subject matter is a malware detection module which does not require the user to initiate any scans. Whenever a malware becomes active on a computer, it may be automatically deleted or quarantined, and the system cleaned and repaired.

The other implementation consists of a scanning module. The scanner may be invoked by the user or scheduled to run at a specific time. The scanning module also helps to identify malware which are installed on the computing device 102 but not active yet. The scanning module uses the same approach to identify malware. The only difference is that instead of collecting data by intercepting function calls it collects data by reading system configuration.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a block diagram of an architecture 100 for detecting and cleaning malware, according to an example implementation of the present subject matter. The environment 100 may further include a computing device 102 which implements malware detection module 104 for detecting and rectifying malware. As would be understood, the computing device 102 may include any device comprising a processor-based resource, with such a computing device 102 being in a position to implement one or more functions based on execution of plurality of instructions which may be stored within the memory of the computing device 102. Examples of such a computing device 102 include, but are not limited to laptops, mobile phones, IOT devices (Internet of Things devices), palmtops, and tablet PCs.

The architecture 100 depicts that data is extracted from various applications 106 running on a computing system 102 and shares this with the malware detection module 104 for detecting and rectifying malware. For example, a request for performing an operation like seeking access to file, data, settings, etc., may be intercepted and relevant data/characteristics is extracted based on the type of request. The extracted and/or generated characteristics may then be defined as operational attributes 110. The operational attributes 110 may then be subsequently analyzed and compared with one or more baseline attributes 112 to ascertain whether the suspected code requesting operation is malicious or benign. Baseline attributes comprises of characteristics of pre-known malicious operations. The analysis result is stored in the data repository 108 (step 118) and the malware detection module 104 takes further action on the basis of the outcome of the analysis. In one embodiment, data repository 108 is any suitable storage device such as one or more hard disk drives, volatile memories, or any other electronic digital data recording device configured to store data. Although data repository 108 is depicted as a single device in FIG. 1, data repository 108 may span multiple devices located in one or more physical locations.

In one example, a request for performing an operation such as read operation, write operation, a rename operation or the like is generated by application 106, is intercepted by malware detection module 104. The relevant information pertaining to the request is forwarded to the data repository where the relevant information is stored into the data repository 108 for further and future analysis (step 114). The extracted relevant information is further sent to the malware detection module 104 (step 116). In an example, the data repository is to store a list of processes, information pertaining to one or more suspicious activity with associated data, dynamic modules created by various processes, current status and result of analyses done by the malware detection module, scan areas, rules and baseline and operation attributes.

If the malware is detected, the computing system may terminate the operation being requested and remove the malware, whereas if the analysis results in operation to be benign, the computing system lets the request to be executed (step 120). The malware detection module may employ a simple customized network or an artificial neural network or any other technique to analyze operational attributes.

In other embodiment, the present subject matter may include a scanning module for performing malware analysis in addition to or independent of the real-time analysis as indicated above. In such scenario, scanning module may initiate an analysis to read and assess susceptible system configuration entries or any configuration entries linked to the aforesaid entry. Based on the assessment of such entries the scanning module may decode a process filename. The scanning module may further check if the process file may be whitelisted. In one example, the scanning module analyses the configuration entries in the same way as it would analyze a second category request coming from intercepting a request from a process. In another example, the scanning module may be implemented within the malware detection module 104. These and other aspects are further described in further details in conjunction with the other figures.

Figure 2:
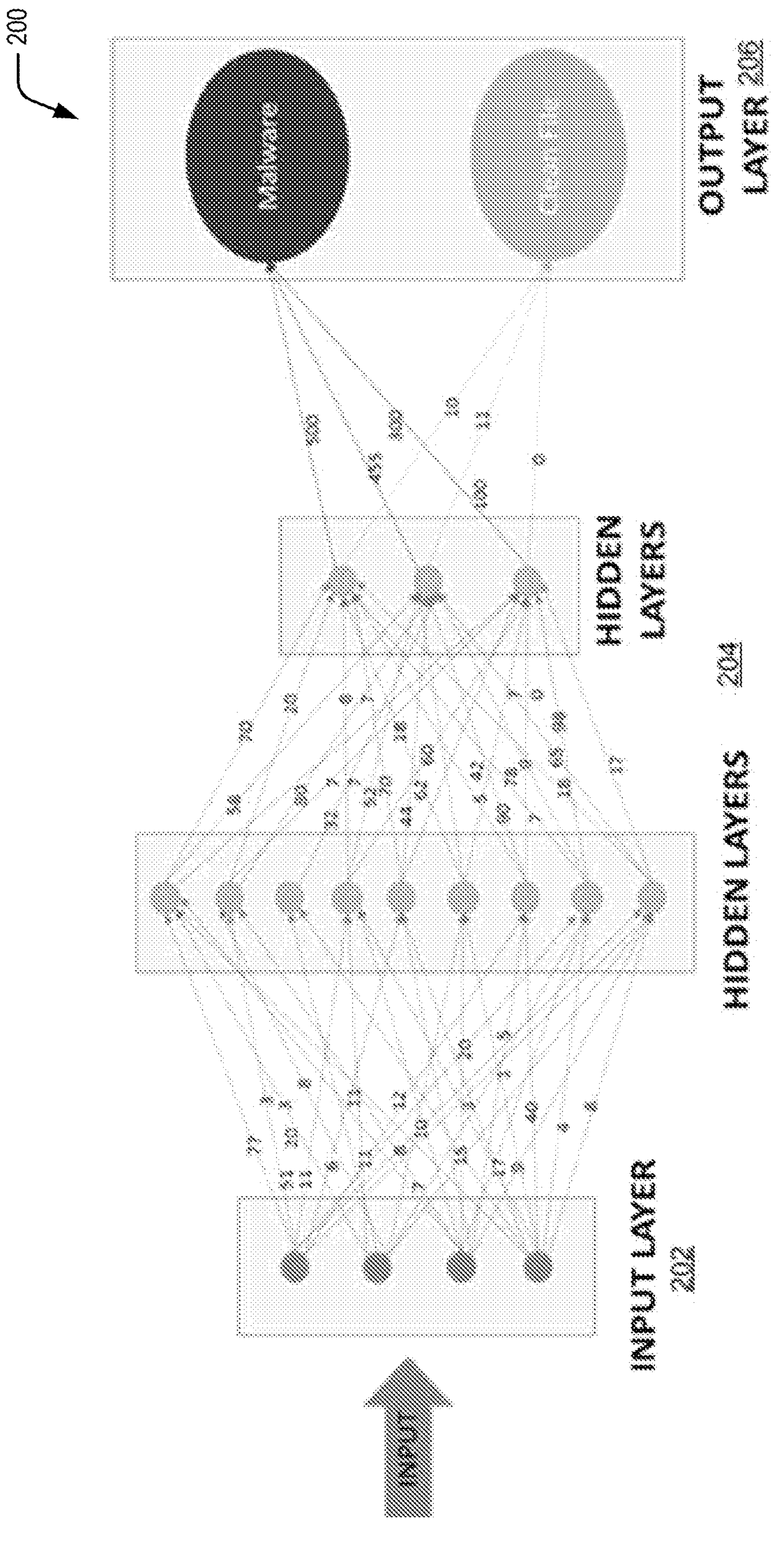
FIG. 2 is a block diagram of a custom network for detecting malware, as per an example of the present subject matter.

FIG. 2 illustrates a block diagram of a customized network 200 for detecting and performing corrective actions pertaining to a malware, according to an example implementation of the present subject matter. Example of such customized network includes, but not limited to, an artificial neural network (ANN). As mentioned with respect to FIG. 1, the malware detection module may employ an ANN or a customized network 200 to analyse the characteristics of the request for performing any operation. The network 200 includes an input layer 202, one or more hidden layers 204, and an output layer 206.

In an example implementation, the nodes on the input layer may represent the functions/information that are being monitored by the malware detection module of the computing system. The relevant data is extracted based on the interception of the request along with the data retrieved from the database may be provided as an input to the input layer. For instance, at each input node, the system inputs the current function/activity (along with all the relevant information about this function) that a current application is performing along with all the previous functions (that the current application has carried out with its relevant information) which are stored in the database. In an example, the plurality of functions further comprises creating, reading, writing one of data and entries stored on the computing system, and modifications affected onto system configuration entries In an exemplary computation process, at each node of the input layer 202, a weight is computed for the input data. The weight may be computed based on predefined rules which perform computation on the input data. Based on the assigned weight, the malware detection module 104 present within the computing device 102, may determine a node in the one or more layers, indicated as hidden layers 204, through which the data may be communicated for further computation. In an example, if the assigned weight exceeds a pre-defined threshold, it may indicate that file or a susceptible code may be a malware. The next node (i.e., node present in the any of the hidden layers 204) on which to send the data may be selected based on the weights assigned post completion of the analyses at a particular node in the input layer 202. At each subsequent node in the one or more hidden layers 204 similar calculations are performed by the computing system. Based on the computations of the one or more hidden layers 204, the computing system may declare a file as a malware or benign, at the output layer 206.

Figure 3:
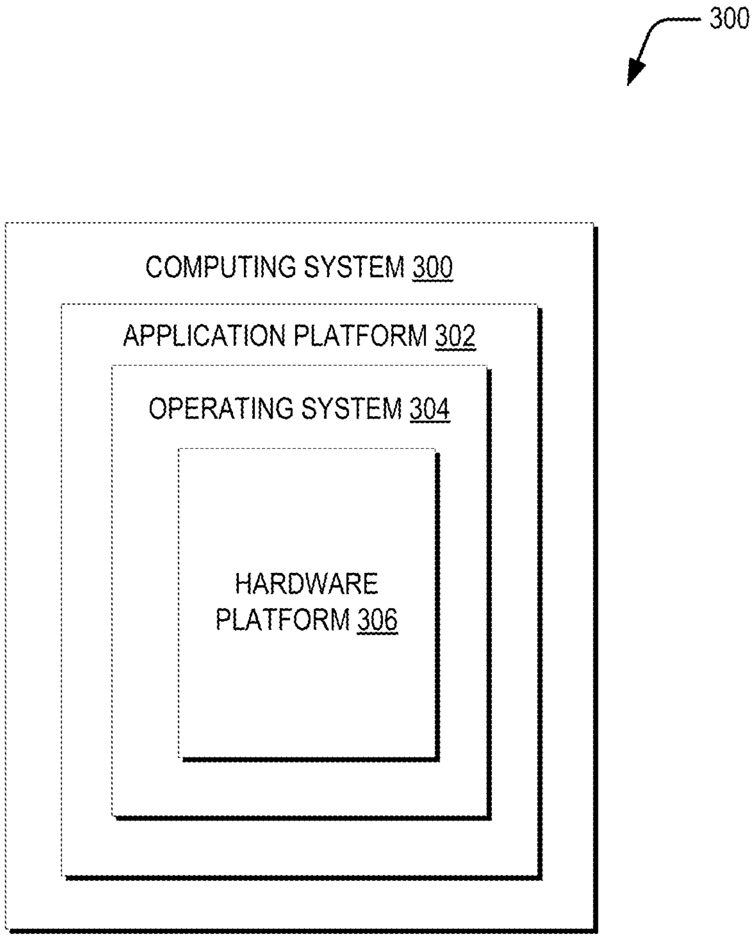
FIG. 3 illustrates a block diagram of another computing system according to an example of the present subject matter.

FIG. 3 is a block diagram of a computing system 300, according to an example implementation of the present subject matter. The computing system 300 (which may be similar to the computing device 100) may be any one of a variety of devices including, but not limited to, personal computing devices, server-based computing devices, personal digital assistants, cellular telephones, mini- and mainframe computers, laptops, set-top boxes, entertainment, and gaming systems, other IOT or electronic devices.

The computing system 300 includes an application platform 302, an operating system 304, and hardware platform 306. For sake of brevity, the computing system 300 does not show the typical components included in the hardware platform 306, such as a main memory, hard drive, keyboard, CPU, and such. For similar reasons, the computing system 300 does not show any components of the operating system 304 or the application platform 302.

The operating system 304 illustrated in FIG. 3 may be a general-purpose operating system such as a Microsoft® operating system, UNIX® operating system or Linux® or Android® or IOS® or OS X operating system. Also, the operating system 304 may be configured to use non-generic hardware designed for specialized computer systems. As known to those skilled in the art, the operating system 304 controls the general operation of a computer and is responsible for management of hardware and basic system operations as well as execution of application programs.

In an implementation, the components of computing system 300 are layered thereby indicating that the present subject matter is embodied in a hierarchical environment. Each layer included in the computing system 300 is independent of systems in inner layers. More specifically, the application platform 302 runs on top of the operating system 304 and is not able to directly access components of the hardware platform 306. Instead, any access to the hardware platform 306 by the application platform 302 is managed by the operating system 304.

Figure 4:
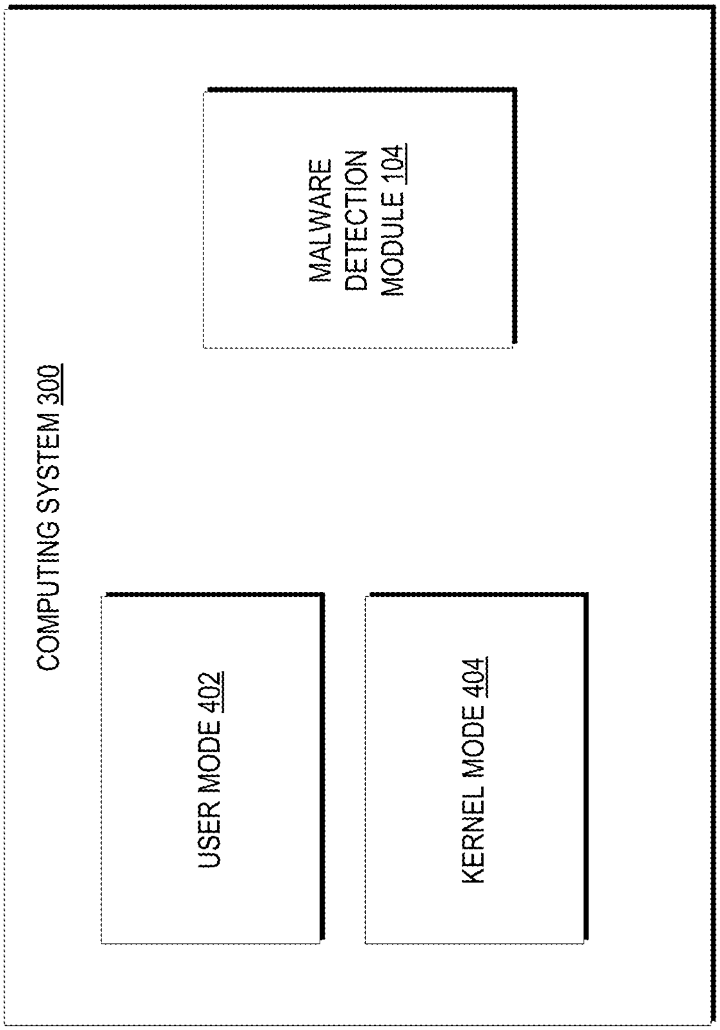
FIG. 4 illustrates a block diagram of another computing system for detecting malware, as per an example of the present subject matter.

FIG. 4 is an architectural level block diagram of the computing system 300, according to an example implementation of the present subject matter. Computing systems, such as computing system 300, are commonly used for performing various read and write operations. For example, a common operation may involve opening a file stored in a storage device of the computing system and display the contents of the file. For example, a user or the operating system of the computing system 300 may send a request to perform an operation, such as a read operation, a write operation, a rename operation, and the like. As described with reference to FIG. 3, I/O requests made in the computing device 300 are handled by a component of the operating system 304 known as an I/O system.

To protect the computing system 300 against malware, the request is intercepted, for example, prior to and/or post completion (but before the result of the request is intimated to the originator) of the request. The computing device 300 illustrated in FIG. 4 includes a user mode 402 and a kernel mode 404. The user mode 402 contains user applications, user mode libraries and the kernel mode 404 includes kernel mode libraries, an I/O system, a local or remote I/O device. The computing device 300 further includes malware detection module 104. In one implementation, the malware detection module 104 consists of the antivirus driver, antivirus service, antivirus GUI, antivirus virtual machine and antivirus DLLs which are also known as guard DLLs.

In an example, the kernel driver(s) aids in gathering information about everything that happens on the computing system 300 which helps the malware detection module 104 to analyze and protect the system. The kernel driver(s) may be a legacy file-system filter driver or mini filter driver or any driver that hooks and intercepts file system and/or other function calls. The kind of driver depends on the implementation of the driver and the kind of operating system it is used in, however for this example the driver is a kernel mode driver. The driver's main purpose is to intercept and monitor function calls including but not limited to I/O calls, loading dynamic modules, new process creation and termination, opening processes and threads, system setting/registry monitoring, ports, and data flow monitoring. Based on these calls a database of processes is created which is used by malware detection module 104, to keep the computing system secure.

The service part of the malware detection module 104 runs in user mode to carry out user mode tasks. The antimalware detection module 104 may also include a Graphical User Interface (GUI) that runs in user mode 402. The main functions of this GUI are to accept user input and transmit them to the different parts of the malware detection module 104, show results or output from other components of the antivirus and display product status. Further, the malware detection module 104 may implement a virtual machine (VM).

The VM is used to run samples in a protected environment, so that it has no effect on the system. The VM may therefore help to unpack samples packed with unknown packers, recognize code, recognize behaviour, and help the heuristic engine to detect API calls that could be considered as suspicious or malicious. This virtual machine may be run in user mode. In an implementation, guard DLLs are injected into vulnerable (to attack from malware) or suspicious processes like web browsers, to monitor them more closely via techniques like function hooking and memory forensic analyses.

In operation, a request to perform an operation, such as a read operation, a write operation, a rename operation, and the like, is received in the computing system 300. For example, the request may be sent by a user or the operating system of the computing system 300.

This request is intercepted, prior to and/or post completion (but before the result of the request is intimated to the originator) of the request. The request is intercepted by an Anti-Virus Driver (AVD) implemented in the kernel mode 404. Certain requests may be intercepted by guard DLLs, service or GUI deployed in the user mode 402. Upon interception, the malware detection module 104 extracts operational attributes 110 from the request and stores it in the data repository 108. The operational attributes 110 may be extracted by monitoring the universe of functions that a malware might use and therefore aid in prediction of the malware. The antimalware detection module 104 may then compare and analyze the operational attributes 110 with the baseline attributes 112 to predict malware.

The analysis may include determining whether the process that is the originator of the current request is whitelisted or not. If whitelisted, no further analysis is carried out. The analysis may also include determining whether the operation performed by the request falls under whitelisted operations. If the request is whitelisted, no further analysis is carried out. When it is determined that the application or the process and the operation are not whitelisted, the malware detection module 104 may categorize the operation in one of the three pre-defined categories. In an example, whitelisted processes further comprise digitally signed processes, system processes or processes marked as benign by the user In a first category, the malware detection module 104 stores the operational attributes of the suspicious activity being performed by the process and forwards the request to the appropriate system/function such as CreateFile function. This information might be used for analyses in the future. In a second category, the operational attributes 110 may be used to detect malware when the request is being forwarded to a relevant system/function for completion. In certain cases, additional information may also be collected by using known algorithms, such as disassembler, virtual machine, heuristic scanning and matching, behavioural scan, keywords identification, data mining and other proprietary algorithms. The second category may be considered as such requests, the corresponding data of which needs to be analyzed by the malware detection module 104.

The operational attributes 110 and the additional information extracted (which form part of the operational attributes) is then collectively analyzed and compared with the baseline attributes 112 based on a plurality of pre-defined rules to predict malware. The result of each analyses done by each rule is given a score and if at any stage while parsing through the rules, the score crosses a predefined threshold then, the process is declared a malware. The operational attributes 110 analyses with the base attributes may include but not limited to analyzing and comparing various function parameters with various process and/or process file parameters like, process memory characteristics, process behaviour, CPU utilization, data and/or code of the process and/or process file, processes and files spawned or created and deleted, which websites the process is trying to connect and send or receive data, what communication ports are opened etc. One operational attribute 110 may be compared with one or more baseline attributes 112 and vice-versa depending upon the rule(s) that the operational attribute 110 has invoked.

In an example, the pre-defined rules may include how and what set of data (operational attributes 110) is to be analyzed with what data or function (baseline attributes 112). The pre-defined rules, operational attributes and baseline attributes are coded into the software logic by an expert in the field. These rules, operational attributes 110 and baseline attributes 112 may be updated as and when required. However, in another implementation creating new rules, operational attributes 110 and baseline attributes 112 and updating them may also be assigned to the software with or without the use of machine learning algorithms.

In a third category, the request and/or result of the request may also be analyzed to detect malware. For example, in case of a read request, data once fetched from a file system is analyzed to check the malware. During the analysis, the steps mentioned under the second category are performed. In addition, the result of the operation is included in the analyses. The malware detection module 104 stores the result of the analysis performed for the first, second and third categories. Based on the above it may be gathered that requests falling in second and third category, operational attributes which are to be utilized either with or without utilizing any previously created operational attributes, may be created. These attributes may be then utilized to check for malware, and wherein operational attributes are extracted and created after analyzing various characteristics of the requests/configuration entry.

In an implementation, if the I/O request analysis signals a malware, the malware detection module 104 may be configured to prevent the I/O request from being satisfied. For example, if the malware is detected, the malware detection module 104 halts the process and informs the user about the malware and performs an action (either user defined or pre-defined) on the operation. In a situation where user may let the malware continue, the user response is stored in the system and the request is executed. Alternatively, the user may stop the malware. In such situation, the malware detection module 104 quarantine the malware and terminates the current operation and the malware. In an example, upon detecting malware, the malware detection module 104 may generate an alert to indicate presence of the detected malware. Thereafter, a user may be presented with an option to stop further execution of the malware. In an example, the malware detection module 104 may eliminate the process, clean the malware, and undoes the changes brought by the malware in the computing system, such as the computing system 102. However, if the user permits further execution of the malware, the user response is stored in the system and the request is passed on to the appropriate system for further or future analysis.

Conversely, if an I/O request does not involve malware, the I/O system causes the I/O request to be executed. The same scenario may also arise when the request is not an I/O request e.g. HeapAlloc, WriteRegistry. In this type of function also which is intercepted by either the antivirus user mode library, GUI or Service or kernel mode driver, a similar approach as stated above (for an I/O request) is adopted to catch malware. The malware detection module may also perform a recovery operation wherein it analyzes what parts of the operating system have been affected by the malware and undoes all the changes incurred by the malware. For example, the malware detection module 104 parses the database which is created within the computing system 300 based on the information collected by interceptions and/or proactively looked for it. Based on the parsing, the malware detection module 104 identifies all modifications that were made to the operating system. Upon identification, the malware detection module 104 may undo such changes.

Figure 5A:
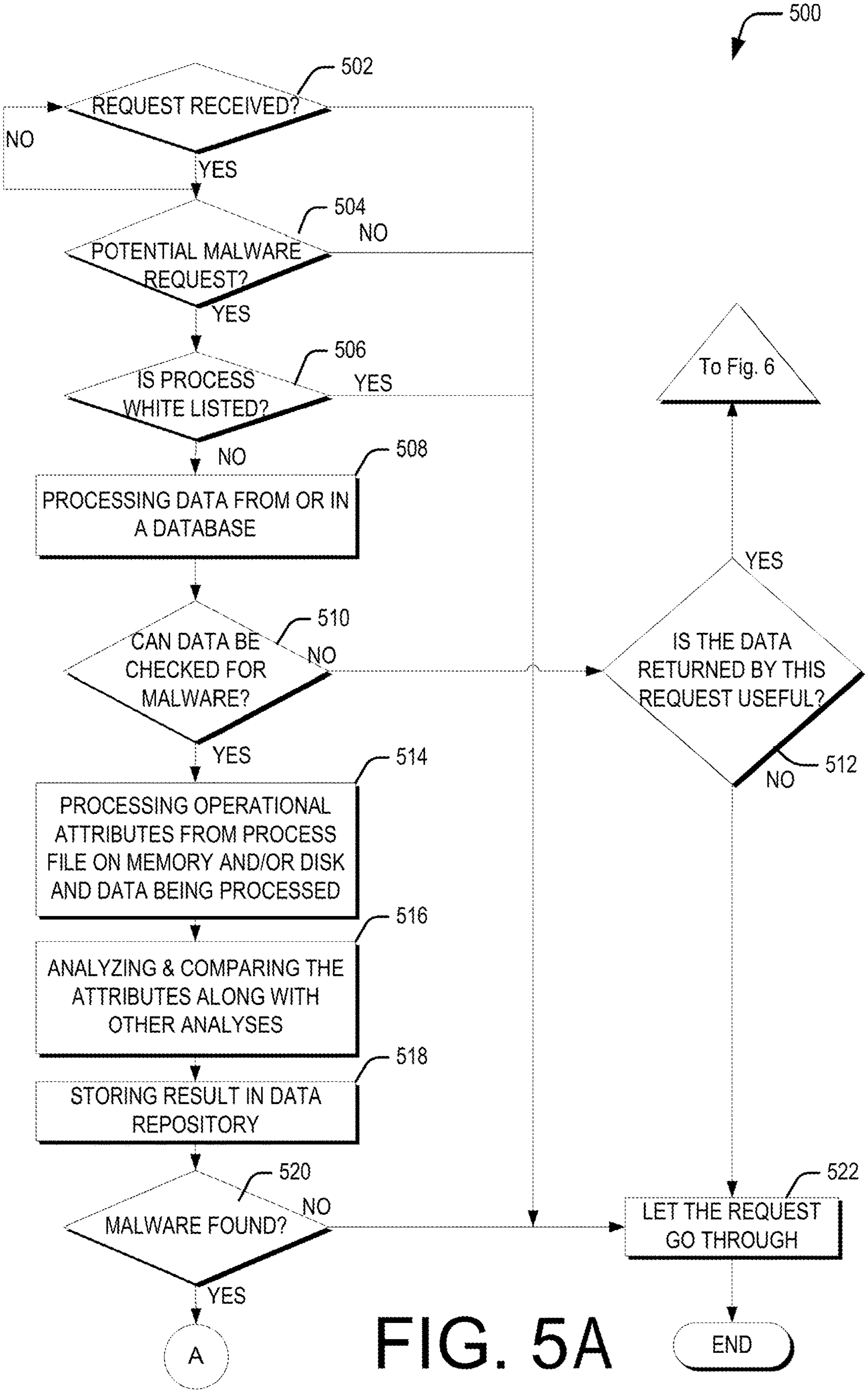
FIGS. 5A-5B illustrates a method for detecting, as per an example of the present subject matter.
Figure 5B:
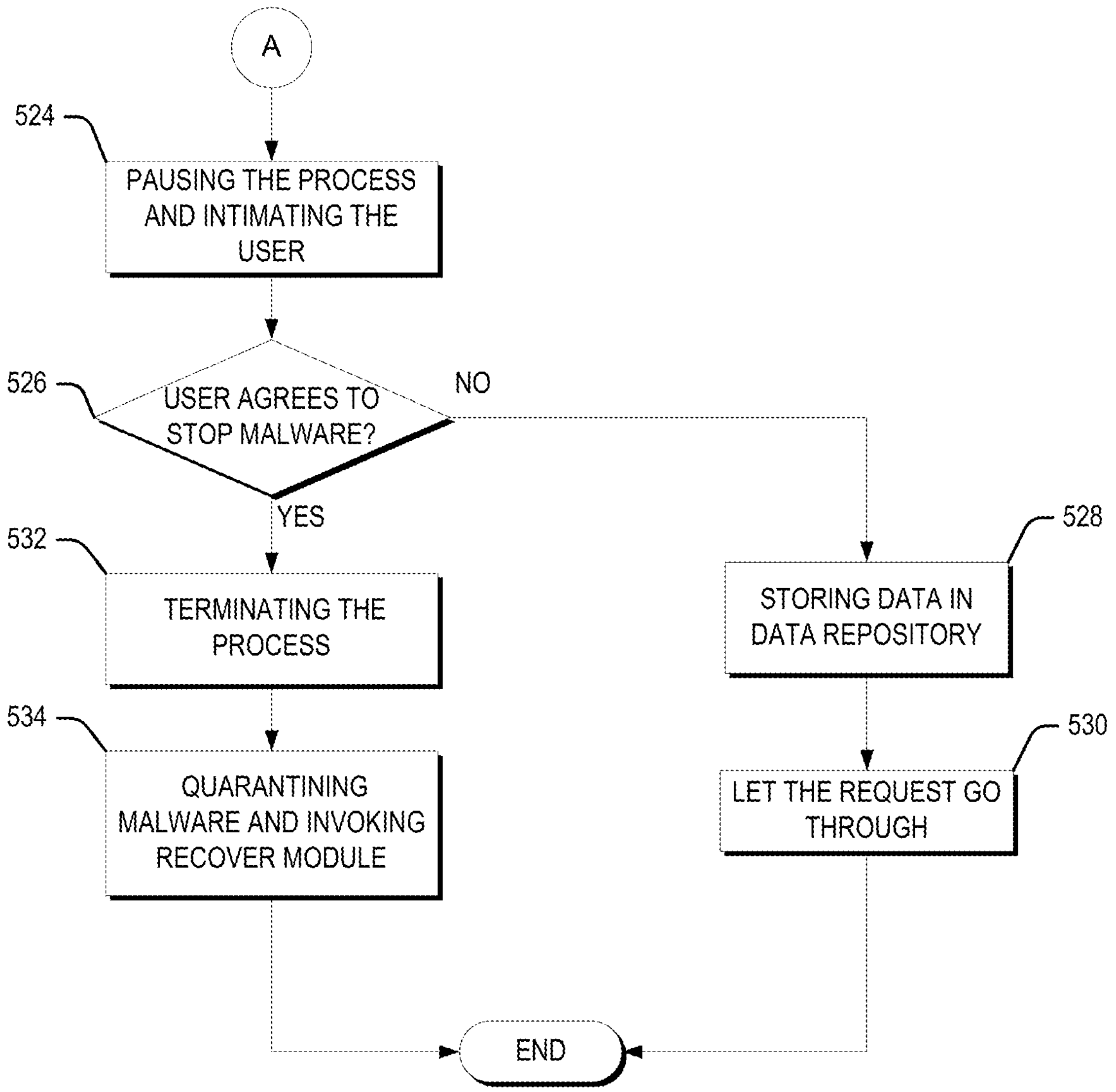

FIG. 5 illustrates a flow diagram depicting a method 500 for detecting and cleaning malware, according to an example implementation of the present subject matter. As explained above, a request originating from an application may be intercepted, so as to analyze the request to ascertain the operation or function requested is benign or malware.

At block 502, the malware detection module 104 remains idle and waits for a request. In one example, a request which may be an I/O request that is received by a kernel mode 404 component of an operating system. The present subject matter may also hook functions that request memory, delete memory, change system configurations and such which are not I/O requests and may be in user mode 402 but may help the present subject matter to track what the current process is doing.

At block 504, the above-mentioned method determines whether the request is a potential malicious request. It is determined whether the request falls within the scope of functions or operations that may be used by malware. It is also known as various requests do not have potential to harm the computing system 102. In one example, an I/O request originating from an application to open a certain type of file (like a text file) in read mode may not be considered as a potential malware risk. However, opening a file in write mode or an attempt to delete system file and the like are considered as potential malware risk. If the request is considered to be potential malware, the above-mentioned method passes the control to block 506 and if the request is considered to be harmless, the method passes the control to block 522, wherein the request is forwarded to the appropriate system or function.

At block 506, the above-mentioned method determines whether the application requesting for an operation or function is whitelisted or not. In one example, the malware detection module 104 may keep a list of all whitelisted operations and/or application in the data repository 108. As discussed above, whitelist may be a list of applications that have been granted permission to execute freely. In an example, whitelisted processes may further comprise digitally signed processes, system processes or processes marked as benign by the user. If the request is intercepted from white listed application, the present entry is stored in the data repository 108 and the method passes control over the block 522, where the request is considered benign and is allowed to execute. But if the application or the operation originating from the susceptible code is not white listed, then the method further moves to block 508. Moreover, blocks 504 and 506 can be interchanged where whitelisted operations are checked prior to checking for potential malware threat without exceeding the scope of this subject matter. In an example, the data repository 108 is to store a list of processes, information pertaining to one or more suspicious activity with associated data, dynamic modules created by various processes, current status and result of analyses done by the malware detection module, scan areas, rules and baseline and operation attributes.

Now, if the operation is not whitelisted and seems to be a potential threat, malware detection module 104 may fill the data repository 108 with the present entry (block 508). In one example, data repository comprises entries such as cache of changes an application has brought, suspicious activities performed by the operation, list of suspicious processes, file-system and other system accesses and changes, and the like. Once it is determined that a request is performing a suspicious operation or function, it is checked if the present entry exists in the data repository 108. If the entry doesn't exist in the data repository 108, then the entry is stored in the data repository 108.

The data repository 108 may be built in volatile memory and altered or cleaned up or written to permanent storage depending upon the changes in the process state and the suspicious activities which the process has performed. Once it is established that this process is performing a suspicious activity, it is checked if this entry exists in the database. If this entry does not exist in the database, this entry is added into the database. This database may be implemented in any model and structure. The model and structure selected to represent this database should not limit the scope of the present subject matter.

At block 510, it is determined whether the type of request can be checked. In one implementation, the type of requests originating from the process are divided into three categories. The first category just adds what suspicious activities (along with its operational attributes) are being performed by the process and forwards the request to the appropriate system or function like a CreateFile function. The second category of requests are the ones whose data needs to be analyzed such as Rename File, Write Registry, Write File and the like. The third category of requests are like read requests. For these requests, the result and data that is the returned due to this request, is also included in the analysis.

For request either falling under first category or third category, the above-mentioned method stores the requisite data in 108 and passes control over to block 512. The requests falling under the second category, the method passes control over to block 514.

At block 514, the malware detection module 104 may generate/extract characteristics for the operation that is presently executing as a result of execution of the suspected code or request. The extracted and generated characteristics may then be captured as information referred to as operational attributes 110. These operational attributes 110 may also be generated from process memory that is sending the request or the data that is sent with the request and/or process file on the disk.

At block 516, these attributes are analyzed and compared in a variety of ways including but not limited to code recognition, code prediction, keyword matching, heuristic analysis and comparison, direct comparison, and behaviour analysis. For more accurate results, it is preferred to incorporate multiple analysis and the result pertaining to each analysis is stored in the data repository 108 (block 518).

At block 520, if malware is not found (by analysis done at 516) the request is forwarded to appropriate system via block 522. However, if malware is found then control is transferred to block 524. At block 524, malware detection module 104 pauses the process and intimates the user that a malware has been detected. In one example, the intimation is done via GUI. The GUI informs the user about the caught malware and presents an option to stop and remove malware. If user agrees to stop malware (block 526), the method passes control over to block 532 and whereas user does not agree to stop the malware, the response is stored in data repository (block 528) and the request is forwarded to the appropriate system for completion (block 530).

At block 532, the malware detection module 104 fails the current intercepted request and terminates the malware and all its related processes. At block 534, malware detection module 104 quarantines or deletes the malware. Then the malware detection module 104 invokes recovery module which analyses the data repository 108 for what changes the current malware process has brought about and undoes all of these changes. The changes may include undoing everything that the malware has done directly or indirectly on the computing system 102. These changes may include disinfecting all files infected by the malware, bringing back deleted files, deleting new files created by the malware, undoing all system configuration changes and such. Moreover, blocks 532 and 534 may be interchanged where recovery module may be invoked prior to terminating the malware process without exceeding the scope of this subject matter.

Figure 6A:
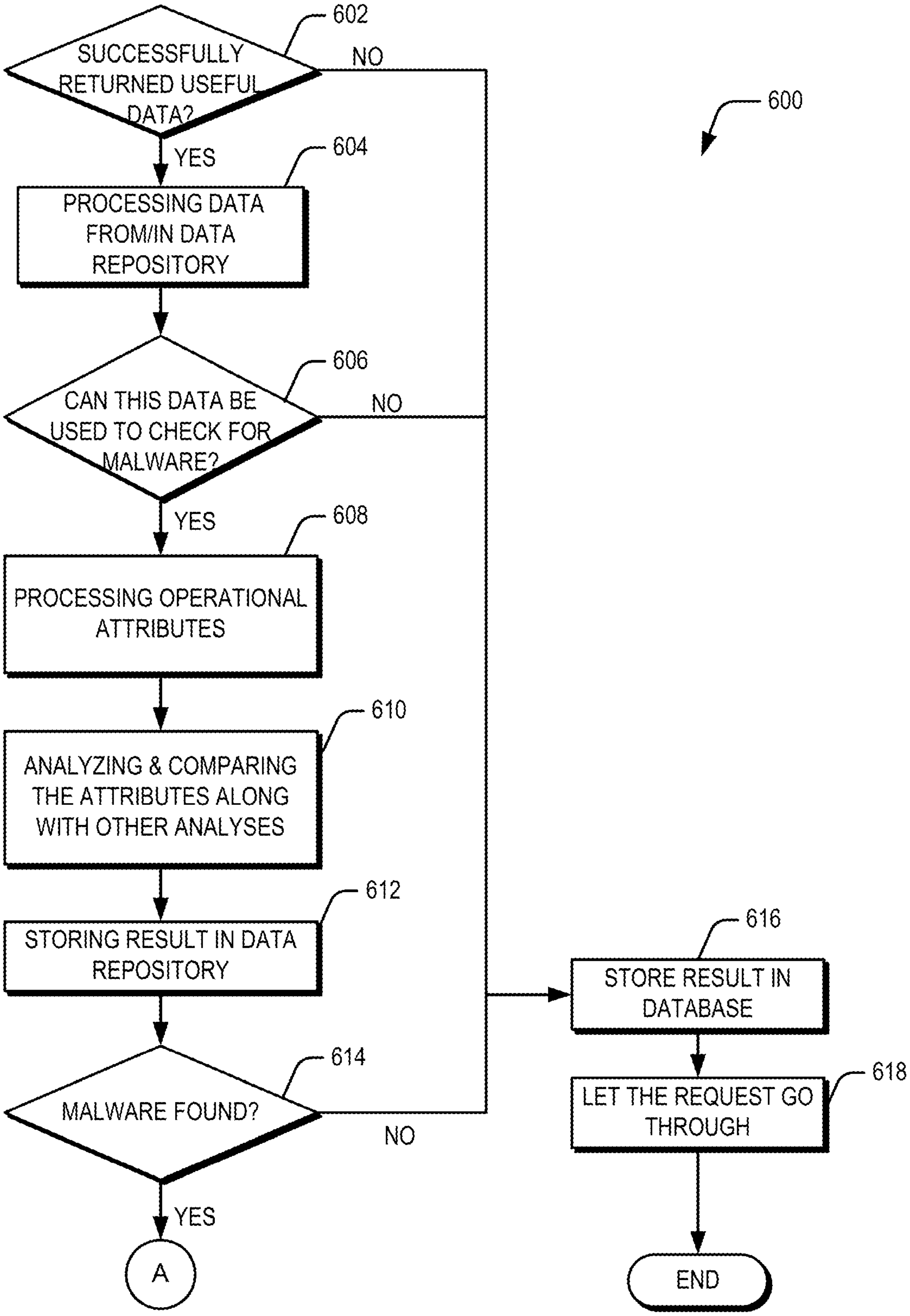
FIGS. 6A-6B illustrates another method for detecting malware, as per an example of the present subject matter.
Figure 6B:
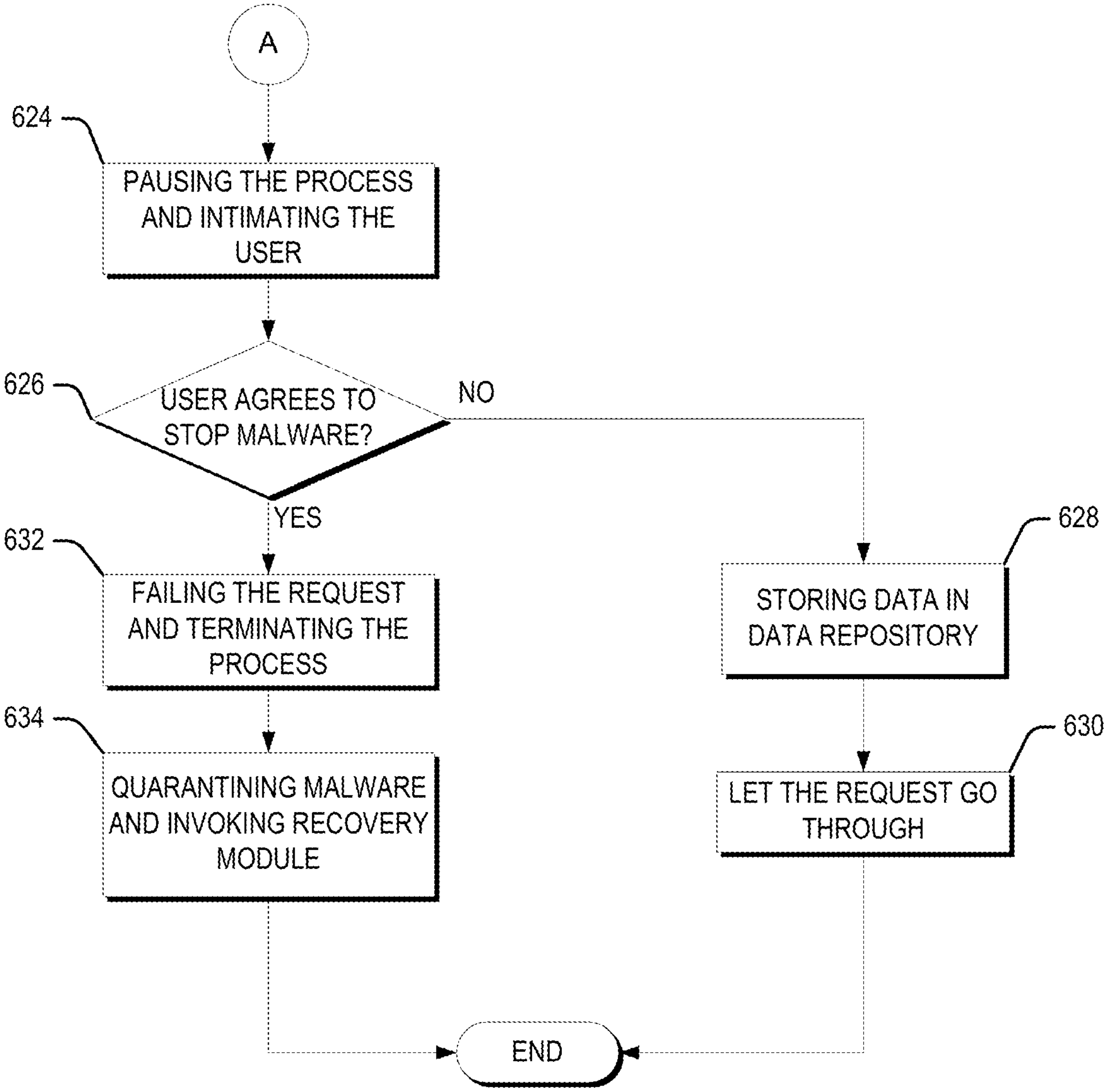

FIG. 6 illustrates a flow diagram depicting a method 600 for detecting and cleaning malware, according to an example implementation of the present subject matter. FIG. 6 is reached via block 512 when data returned by the present request is to be used for malware check. In one example, the kind of request is a read request. The data requested by an application is fetched from the file system and available for malware check only when returning from the file system. This example should be construed as exemplary and not limiting.

At block 602, it is determined if the data requested is retrieved successfully. If the request has failed the data repository 108 is updated (at block 616) and the result is forwarded to the appropriate system or function via block 618. However, if the retrieval of the requested data is successful, the control passes over to block 604.

At block 604, a similar check is done to know whether this entry exists in the data repository 108. If the present entry does not exist in the data repository, malware detection module 104 adds the present entry into the data repository 108.

At block 606, it is determined whether the data retrieved, or result after completing the request, can be utilized for analyzing the presence of malware. In one example, the results are divided into two categories. The first category just adds the result of the suspicious activity performed by the operation and forwards the reply to the appropriate system or function. The second category of requests are the ones whose data needs to be analyzed. Such requests are Read Registry, Read File, Write File, Rename File and the like. The data coming from these types of requests are analyzed to explore more about the characteristics of the presently executing operation. In other example, in a read request, the initial few bytes of a file can be analyzed to determine what type of file is being read from (.exe .vbs, .dll etc.), whereas for a write request, a full analysis may be done by malware detection module 104. At the present block, it is decided which category our request falls into. If the request falls in the first category, the result is added to our database (as illustrated in block 616) and then passed on to the appropriate function or system as depicted in block 618. If the request falls into the second category, then the result has to be analyzed.

At block 608, based on the collected characteristics of the file and process behaviour, operational attributes 110 are generated for malware check. These attributes are generated from the executing process that is sending the request or the data that is sent with the request or fetched from the present request and/or process file on the disk.

At block 610, the above-mentioned method analyzes and compare the generated operational attributes 110 in a variety of ways including code recognition, keyword analyses, heuristic analyses and comparison, direct comparison, and behaviour analyses. It may take more than one of these analyses to accurately predict malware. This analysis is similar to the one done at block 514 and 516 with the addition of the result of this request in this analysis. Detail description of this analyses is explained in conjunction with FIG. 7.

At the block 612, the result of each analyses is stored in the data repository 108. At block 614, if a malware was not detected, the result may be stored (at block 616) and the request is forwarded to the appropriate system or function (as depicted in block 618). However, if malware is found, then control is transferred to block 624.

At block 624, the malicious operation is paused, and the user is intimated about it. In one example, the intimation may be done via the GUI. The GUI informs the user about the caught malware and provides for an option to quarantine or/and remove the malware.

At block 626, the GUI displays the name of the malware and gives the user an option to stop and remove the malware or let the malicious operation continue. If the user selects to let the malware continue then the malware detection module 104 that has intercepted the request is informed about the same and control is transferred to block 628.

At block 628, the malware detection module 104 stores the user response in the data repository 108 and the request or malicious operation is passed to the appropriate system/function (block 630). However, if the user chooses to stop and remove the malware, then control is transferred to block 632.

At block 632, the user has agreed to stop and remove the malware. The malware detection module 104 terminates the malicious process and fails the current reply. At bock 634, the malware detection module 104, depending upon the user setting, quarantines or deletes the malware from the endpoint. In one example, the malware detection module 104 invokes its recovery module which further analyzes the data repository 108 for the changes that were incurred to the computing system 102 by the malicious process which may be file system accesses and changes, system configuration accesses and changes, forked or terminated process/threads, loaded/unloaded modules, created/opened/closed sockets or other communication ports, created/opened/closed memory. Then, malware detection module 104 undoes all the changes that were incurred due to the malicious process. Moreover, blocks 632 and 634 may be interchanged where recovery module may be invoked prior to terminating the malware process without exceeding the scope of this subject matter.

Figure 7:
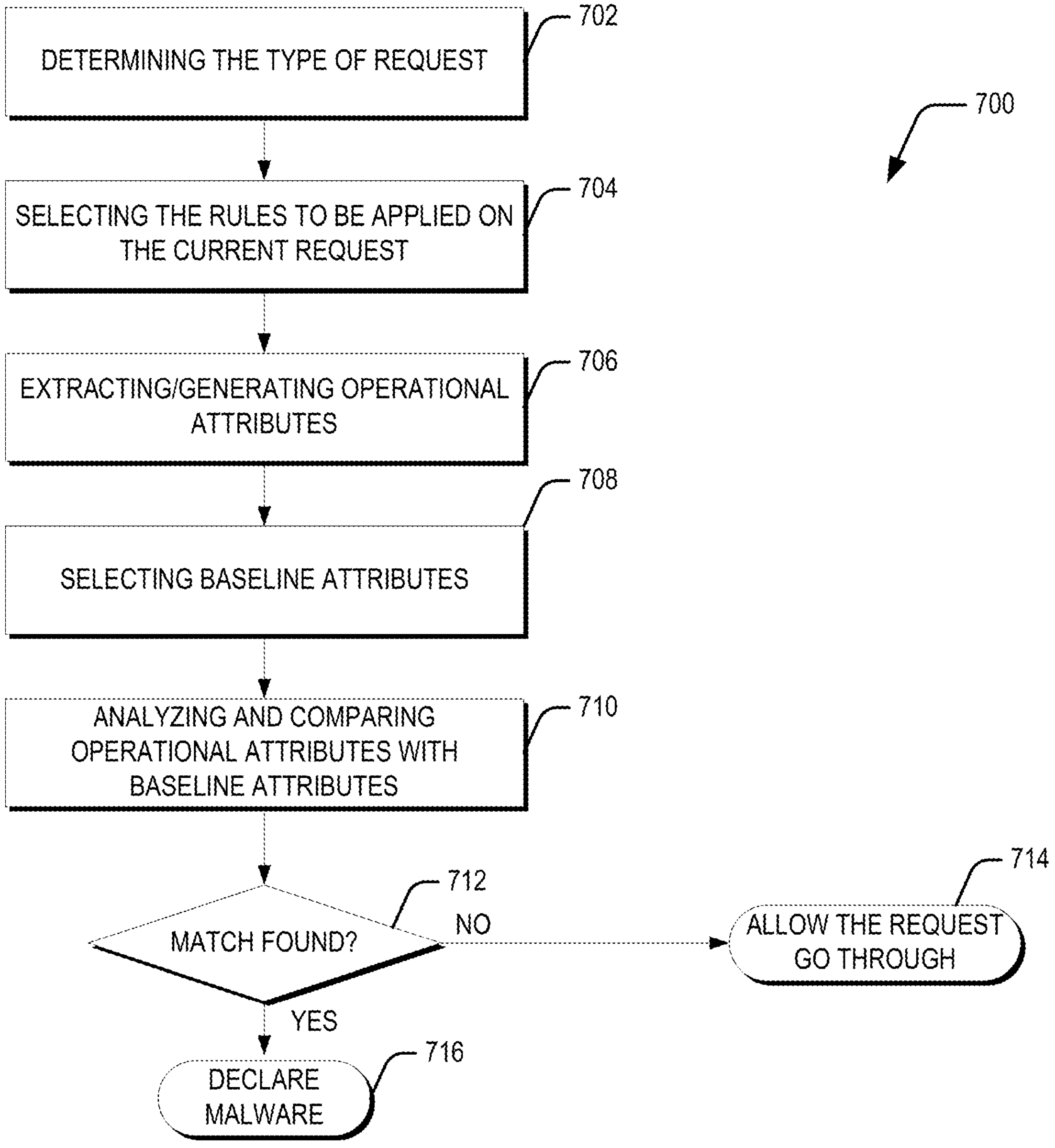
FIG. 7 illustrates yet another method for detecting malware, as per an example of the present subject matter.

FIG. 7 illustrates a flow diagram depicting the method for detecting and removing malware, according to an example implementation of the present subject matter. The method 700 gives a detailed description of what happens at block 514, 516, 608 and 610 to detect malware. In the exemplar implementation, the method 700 intercepts write function coming from the user mode and/or kernel mode.

At block 702, the operation determined to be performed is monitored by the malware detection module 104. In an example, the decision of monitoring the operation is made after the whitelisting process as described in block 506. Moreover, the operation is identified as an interesting operation based on the characteristics of the write operation like characteristics of destination file and the characteristics of the process/file that is performing it.

At block 704, based on the characteristics of this request combined with the characteristics of all previous requests originating from this process, rules to apply on the current operation are selected. Based on these rules, data or characteristics are extracted to make operation attributes. In one example, these operational attributes may be in form of series of coded sequence. The operational attributes as used herein may be understood as a length of data selected/made using characteristics, behaviour and data of the current process used to scan for malware depends on various factors like size of file, type of file (.exe, .dll, .vbs, .docm, .bat), previous process behaviour, characteristics and anomalies of process memory including stack, heap, virtual memory and managed memory if present, amount and type of memory requested by the process, number and type of source and number and type of destination of the request, type of data in the data buffer, type and characteristics of the request, size of data buffer, the speed of scanning required vs the accuracy required.

The area from where operational attributes of the specified size are selected may include source process memory or system cache or from data fetched/collected from the destination file or from the buffer being used in the current operation and compared with the destination area in the in-memory and/or on-disk process file or from commands or operations that the process file has carried out or the destination file or the process memory including stack, heap, virtual memory and managed memory if present, or the source of the operational attributes selected may be from the source area in the in-memory and/or on-disk process file or from commands or operations that the process file has carried out or from the process memory including stack, heap, virtual memory and managed memory if present and compared with the destination area in the intermediate buffer where data being written/flushed is collected or from system cache or from data fetched/collected from the destination file or from the current buffer being used in the current operation.

As a result of the operational attribute/indicator comparison with the baseline attributes, entire source and destination area or a part of it may be parsed and compared until a match or other pre-determined condition is satisfied. The number of operational attributes to scan and compare with the baseline attributes, their size, location and other characteristics may depend upon factors like characteristics of file, previous process behaviour, characteristics of process memory including stack, heap, memory, amount and type of memory requested and changed by the process, number and type of source and number and type of destination of the request and type of data in the data buffer, type and characteristics of the request. Depending on these factors and system variables the present subject matter decides on which operational attributes to compare with which baseline attributes including their size and location. Like an analysis of the characteristics of the process memory including stack, heap, virtual memory and managed memory if present from which the commands are issued and based on its characteristics and combining all these analyses further with the total analyses of all the memory required and acquired by the process and the actual memory granted and the actual memory characteristics in the process file, any anomalies in any of these may influence/affect the selection of which operational attributes to compare with which and how many baseline attributes.

These rules which decide which and how many operational attributes are compared with which baseline attributes are pre-defined. The pre-defined rules are coded into the software logic by an expert in the field. These rules, operational attributes and baseline attributes may be updated as and when required. However, in another implementation making new rules, operational attributes and baseline attributes and updating them may also be assigned to the software with or without the use of machine learning algorithms.

At block 706, based on the rules selected for analyses of this request operational attributes are extracted/generated for this operation.

At block 708, baseline attributes are chosen according to the chosen rules.

At block 710, a comparison is made between the operational attributes generated and the baseline attributes. This comparison is either a comparison to find an exact match or may be a heuristic match. The type of comparison depends again on the rules chosen for comparison and speed vs accuracy requirements.

In certain cases, while comparing and analyzing attributes some more data/attributes may be required, and more rules may be selected and invoked. In this case more operational attributes may be extracted and compared to baseline attributes.

The attribute extraction may also include in certain cases running a disassembler or virtual machine or a state machine, identifying keywords sequences or any other form of table comparison to understand the intentions of the current activity. Such scrutiny gives a detailed view of the operation being carried out, which helps in identifying malware At decision block 712, it is determined whether a malware is found or not. If malware is not found, then the method moves to block 714 from where the request is forwarded to the appropriate system/function. If a malware is found, the method moves to block 716.

Moreover, the analysis include, but is not limited to, the below mentioned points. Renaming a file, analyzing what system/registry changes the process file is doing, trying to open a website without user's permission, trying to send an email programmatically, uploading or downloading data automatically, trying to insert a hook in any of the system functions or other API functions. Recognizing code which does not match with the icon or extension of the file are a giveaway that the file is trying to hide or misguide a user. In other examples, changing file attributes like making a hidden or a system file, analyzing characteristics of file system and system settings/configuration/registry open, read, write, search, and delete commands, read the entries for program uninstall list entries in settings/configuration/registry may be further analyzed in detail to enhance the accuracy of this analyses. Leveraging the compute capacity of machines and data mining techniques the present subject matter identifies the broadest possible set of characteristics of a file.

There are several functions and processes such as checking for polymorphic decryption routines via a disassembler or virtual machine, analyzing what files in what mode the file is trying to open, checking and recognizing code patterns and algorithms for a metamorphic engine, trying to inject a module/DLL into a process, trying to inject and run code into another process or own process, module load requests, other process opening requests, creating other thread requests. Analyses of these characteristics and behaviour combined with the above techniques greatly help in increasing the accuracy of the combined algorithm. All this information is continuously provided to the our customised network which evaluates whether the process file is malicious or benign.

However, the choice of network model either neural or other model should not be considered to limit the scope of the subject matter. Other models of evaluation including, but not limited to, mathematical models, supervised learning, unsupervised learning, expert systems, and statistical models may also be used to predict the outcome of this analyses either independently or in jointly. If the analysis concludes the current process as a benign process as recognized through various techniques, then control is passed to block number 714.

In another implementation, the malware detection module may implement a manual scan to be initiated by the user or the operating system. The scanning may be implemented by a scanning module. The scanning module may scan susceptible configuration entries which a malware might use. The entries are then analysed and interpreted to find the process which may invoke or are running by extracting the executable from the entry. Thereafter, the process may be checked for whitelisting. If whitelisted then this entry is ignored. If not whitelisted, then the whole entry is analysed in the same way a second category request from a process is analysed. The operational attributes may be utilized either with or without utilizing any previously created operational attributes to check for malware are extracted and created after analyzing characteristics of the configuration entry being analyzed and/or any configuration entries linked to this entry. If on analysis the entry is found to be suspicious or pertaining to a malicious activity then the entry is highlighted to the user. If the user chooses to delete this entry then the entry is passed to the recovery module which then terminate all the processes linked to this entry and deletes all the entries linked to this entry, completely cleaning the system of this malware.

The above stated methods may be implemented within a driver in kernel mode via function hooking or any other service provided by the operating system (like Microsoft's Filter Manager), in a kernel mode static or dynamic module library (like .dll and .lib in Microsoft Windows), in a user mode static or dynamic module library or any hook functions provided by the operating system without departing from the spirit and scope of the subject matter. Also, while illustrative embodiments have been illustrated and described, it will be appreciated that various changes can be made therein without departing from the spirit and scope of the subject matter.

Although implementations for malware detection and rectification in computing systems have been described in a language specific to structural features and/or methods, it is to be understood that the subject matter is not necessarily limited to the specific features or methods described. Rather, the specific features and methods are disclosed as exemplary implementation for malware detection and rectification in computing systems.

I claim:

1. A method for detecting and rectifying a malware threats in a computing system, the method comprising:

intercepting a request from a process, wherein the process is to implement a plurality of functions to be caused pursuant to an execution of a susceptible code, wherein the plurality of functions comprises creating, reading, writing one of data and entries stored on the computing system, and modifications affected onto system configuration entries;

determining a type of the request, wherein the types of requests originating from the process is one of a first category, second category and third category;

extracting operational attributes from the request based on the intercepted request affected by the execution of the susceptible code; and on determining the type of request as the first category, storing the corresponding operational attributes of a suspicious activity being performed in a data repository;

on determining the type of request as the second category, analyzing extracted operational attributes based on baseline attributes for evaluating the susceptible code to be malicious or benign, wherein the baseline attributes comprise characteristics corresponding to operations known to be performed by malware;

on determining the type of request as the third category, analyzing extracted operational attributes and result and/or data returned by the request based on baseline attributes for evaluating the susceptible code to be malicious or benign.

2. The method as claimed in claim 1, wherein the method comprises:

determining whether the process is whitelisted, wherein whitelisted processes further comprise digitally signed processes, system processes or processes marked as benign by a user.

3. The method as claimed in claim 1, wherein the computing system further comprises a data repository, wherein the data repository is to store a list of processes, information pertaining to one or more suspicious activity with associated data, dynamic modules created by various processes, current status and result of analyses done by a malware detection module, scan areas, rules and baseline and operational attributes.

4. The method as claimed in claim 1, wherein:

for the request falling in second and third category, creating operational attributes which are to be utilized either with or without utilizing any previously created operational attributes to check for malware, and wherein operational attributes are extracted and created after analyzing various characteristics of the requests/configuration entry; and for the request for falling in the third category, analyzing the result and data that is returned due to the request.

5. The method as claimed in claim 1, wherein the operational attributes are analyzed using one of code recognition, code prediction, key word recognition and analyses, heuristic analyses and comparison, direct comparison, and behaviour analyses.

6. The method as claimed in claim 1, wherein the method comprises:

upon detecting malware, generating an alert to indicate presence of the detected malware; and presenting a user with an option to stop further execution of the malware.

7. The method as claimed in claim 6, wherein the user response is stored in a system and the request is passed on to an appropriate system, if the user permits further execution of the malware.

8. The method as claimed in claim 6, wherein on approval of the user, the computing system eliminates the process, cleans the malware, and undoes changes brought by the malware in the computing system.

9. The method as claimed in claim 1, wherein the method further comprises reading, by a scanning module of the malware detection module, susceptible system configuration entries to detect malware by analyzing configuration entries by creating corresponding operational attributes which are to be utilized either with or without utilizing any previously created operational attributes to check for malware, and wherein operational attributes are extracted and created after analyzing characteristics of one of the configuration entries and any configuration entries linked to the configuration entries.

10. The method as claimed in claim 9, wherein the method comprises checking if a process file is whitelisted.

11. A system comprising:

a processor;

a malware detection module coupled to the processor, wherein the malware detection module is to:

intercepting a request from a process, by the system, wherein process is to implement a plurality of functions caused pursuant to an execution of susceptible code, wherein the plurality of functions comprises creating, reading, writing one of data and entries stored on the computing system, and modifications affected onto system configuration entries;

determine a type of the request, wherein the types of request originating from the process is one of a first category, second category and third category;

extract operational attributes from the request based on the intercepted request affected by the execution of the susceptible code; and on determining the type of request as the first category, store the corresponding operational attributes of a suspicious activity being performed in a data repository;

on determining the type of request as the second category, analyze extracted operational attributes based on baseline attributes for evaluating the susceptible code to be malicious or benign, wherein the baseline attributes comprise characteristics corresponding to operations known to be performed by malware;

on determining the type of request as the third category, analyze operational attributes and result and/or data returned by the request based on baseline attributes for evaluating the susceptible code to be malicious or benign.

12. The system as claimed in claim 11, wherein the malware detection module is to build a data repository containing entries to track details of process activities.

13. The system as claimed in claim 11, wherein the malware detection module is to categorize the types of request originating from process in one of the three categories.

14. The system as claimed in claim 11, wherein the malware detection module further comprises a scanning module, wherein the scanning module is to:

read susceptible system configuration entries within the system;

further ascertain whether a process file is whitelisted for each of the susceptible system configuration entries; and on determining the process file to be whitelisted, ignore the corresponding susceptible system configuration entry;

on determining the process file not to be whitelisted, further analyzing the corresponding susceptible system configuration entry;

based on analyzing the entry, selecting a rule for assessing;

extracting operational attributes; and utilizing determined operational attributes either with or without utilizing any previously created operational attributes to further check for malware, wherein operational attributes are extracted and created after analyzing characteristics of one of the configuration entries and any configuration entries linked to the configuration entries.

15. The system as claimed in claim 11, wherein the operational attributes are analyzed with plurality of baseline attributes in a variety of ways including code recognition, code prediction, key word recognition and analyses, heuristic analyses and comparison, direct comparison, and behaviour analyses.

16. A non-transitory computer-readable medium comprising computer-readable instructions being executable by a processing resource to:

intercept a request from a process, by a system, wherein process is to implement a plurality of functions caused pursuant to an execution of susceptible code, wherein the plurality of functions comprises creating, reading, writing one of data and entries stored on the computing system, and modifications affected onto system configuration entries;

determine a type of the request, wherein the types of request originating from the process is one of a first category, second category and third category;

extract operational attributes from the request based on the intercepted request; and on determining the type of request as the first category, store the corresponding operational attributes of a suspicious activity being performed in a data repository; or on determining the type of request as the second category, analyze extracted operational attributes based on baseline attributes for evaluating the susceptible code to be malicious or benign, wherein the baseline attributes comprise characteristics corresponding to operations known to be performed by malware;

on determining the type of request as the third category, analyze extracted operational attributes and result and/or data by the request based on baseline attributes for evaluating the susceptible code to be malicious or benign.

17. The non-transitory computer-readable medium as claimed in claim 16, wherein the operational attributes are analyzed with baseline attributes based on one of code recognition, code prediction, key word recognition and analyses, heuristic analyses and comparison, direct comparison, and behaviour analyses.

* * * * *